Patented July 12, 1932

1,867,123

UNITED STATES PATENT OFFICE

ADOLF WEIHE, OF EILENBURG IN SACHSEN, GERMANY, ASSIGNOR TO DEUTSCHE CELLU-LOID-FABRIK, OF EILENBURG IN SACHSEN, GERMANY, A CORPORATION OF GERMANY

PROCESS OF MAKING MIXED CELLULOSE ESTERS

No Drawing. Application filed March 14, 1930, Serial No. 435,961, and in Germany March 25, 1929.

The present invention relates to mixed cellulose esters and more particularly to a process for introducing the residue of nitric acid into the molecule of a cellulose ester partly esterified by organic acids, but containing still unsubstituted hydroxyl groups. Another object of the invention are the new products obtainable according to the new process.

When treating acetyl cellulose with a nitrating mixture containing sulfuric acid and nitric acid, nitric acid residues enter the molecule. On account of the low soaking capacity of the technical acetyl cellulose, however, the reaction does not occur uniformly and it is difficult to remove the sulfuric acid compounds also formed. When acting, on the other hand, only with nitric acid upon acetyl cellulose, first of all a degradation of the cellulose occurs.

According to the present invention cellulose esters such as, for instance, cellulose formates, -acetates, -butyrates, -palmitates, -stearates or the like still containing free hydroxyl groups, can be transformed into mixed esters by adding a dehydrating agent, for instance, acetic acid anhydride, to a solution of the cellulose ester in a solvent containing or consisting of diacetyl-ortho-nitric acid, the quantity of the dehydrating agent added chiefly determining the content of nitro groups in the product.

Diacetyl-ortho-nitric acid (cf. Pictet and Genequand, Berichte der Deutschen Chemischen Gesellschaft, Vol. 35, 1902, page 2526, and Houben-Weyl, Die Methoden der organischen Chemie, 1st edition, page 1153), corresponds to the formula:

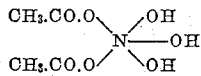

and is a derivative of the hypothetical ortho nitric acid of the formula:

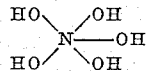

It is a liquid boiling without decomposition at 127.7° C. and may be formed, for instance, by reacting with nitric acid of specific gravity 1.4 upon acetic anhydride or preferably with nitric acid having the specific gravity 1.52 upon glacial acetic acid.

The diacetyl-ortho-nitric acid can previously be made, and the cellulose ester dissolved therein, or the acid may be caused to form in the reaction mixture itself. The mixture may also contain compounds added, for instance, as a diluent in view of a reduction of costs or in order to control the reaction.

The esterification occurs very rapidly and without difficulties. The equilibrium is generally attained after 10 minutes even at low temperature.

The new process is distinguished by the following particular advantages:

1. It requires only a very short time and occurs uniformly;
2. The reaction product is rendered free from acid and stable by washing it with cold water;
3. The cellulose compound is not degraded as will be proved by the practically unchanged viscosity of the end-product compared with that of the starting material;
4. Insensitiveness against the action of water as shown by pure nitrocellulose is obtained even if only 2 to 3 per cent of nitrogen enters the molecule of the cellulose ester.

The following example serves to illustrate the invention:—

100 grams of diacetyl cellulose are dissolved in a mixture of 400 grams of diacetyl-ortho-nitric acid and 200 grams of glacial acetic acid at +5° C. to +10° C. A cooled mixture of 50 grams of acetic acid anhydride and 50 grams of glacial acetic acid is gradually added thereto, while stirring, and stirring is continued for 10 minutes while cooling. Then, the mixed ester formed is precipitated by water and washed free from acid. It is obtained according to the conditions observed for the precipitation in a granular or flaky form. It dissolves in acetone, methylketone, diacetone-alcohol, a mixture of benzene, alcohol and acetone or the like.

The present invention is not limited to the foregoing example or to the specific details given therein. Thus, for instance, I may use as starting material a mono-acetate of cellulose or a cellulose ester containing in its molecule the residue of another lower or higher, saturated or unsaturated fatty acid, or mixed esters as, for instance, cellulose acetate-butyrate. These cellulose derivatives containing still unsubstituted hydroxyl groups react in an analogous manner and yield mixed esters without degradation of the cellulose molecule. The nitrogen content of the end products may be increased or diminished by varying correspondingly the quantities of the nitrating agent. Instead of acetic acid anhydride I may use other dehydrating agents known in the art as, for instance, other acid anhydrides.

Few simple experiments according to the conditions of the foregoing example should be made to determine the best kind of proceeding and the most suitable amount of the nitrating reagent to employ with a particular cellulose ester in order to obtain the desired degree of further esterification.

I contemplate as included within my invention all such modifications and equivalents as fall within the scope of the appended claims.

What I claim is:—

1. The process which comprises acting upon an organic cellulose ester containing unsubstituted hydroxyl groups in the cellulose molecule with diacetyl-ortho-nitric acid in the presence of a dehydrating agent.

2. The process which comprises acting upon an organic cellulose ester containing unsubstituted hydroxyl groups in the cellulose molecule with diacetyl-ortho-nitric acid in the presence of acetic acid anhydride.

3. The process which comprises dissolving an organic cellulose ester containing unsubstituted hydroxyl groups in the cellulose molecule in diacetyl-ortho-nitric acid and adding acetic acid anhydride.

4. The process which comprises acting upon acetyl cellulose containing unsubstituted hydroxyl groups in the cellulose molecule with diacetyl-ortho-nitric acid in the presence of a dehydrating agent.

5. The process which comprises acting upon acetyl cellulose containing unsubstituted hydroxyl groups in the cellulose molecule with diacetyl-ortho-nitric acid in the presence of acetic acid anhydride.

6. The process which comprises dissolving acetyl cellulose containing unsubstituted hydroxyl groups in the cellulose molecule in diacetyl-ortho-nitric acid and adding acetic acid anhydride.

7. The process which comprises acting upon diacetyl cellulose with diacetyl-ortho-nitric acid in the presence of a dehydrating agent.

8. The process which comprises acting upon diacetyl cellulose with diacetyl-ortho-nitric acid in the presence of acetic acid anhydride.

9. The process which comprises dissolving diacetyl cellulose in diacetyl-ortho-nitric acid and adding acetic acid anhydride.

In testimony whereof, I affix my signature.

ADOLF WEIHE.